US012552159B2

(12) United States Patent
Murayama et al.

(10) Patent No.: US 12,552,159 B2
(45) Date of Patent: Feb. 17, 2026

(54) DRIVE WAVEFORM DETERMINATION METHOD, DRIVE WAVEFORM DETERMINATION DEVICE, AND STORAGE MEDIUM

(71) Applicant: SEIKO EPSON CORPORATION, Tokyo (JP)

(72) Inventors: Toshiro Murayama, Fujimi-machi (JP); Atsushi Toyofuku, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 194 days.

(21) Appl. No.: 18/324,270

(22) Filed: May 26, 2023

(65) Prior Publication Data

US 2023/0382108 A1 Nov. 30, 2023

(30) Foreign Application Priority Data

May 30, 2022 (JP) ................................ 2022-087910

(51) Int. Cl.
*B41J 2/145* (2006.01)
*B41J 2/045* (2006.01)

(52) U.S. Cl.
CPC ....... *B41J 2/04588* (2013.01); *B41J 2/04581* (2013.01)

(58) Field of Classification Search
CPC B41J 2/04588; B41J 2/04581; B41J 2/04558; B41J 2/145
See application file for complete search history.

(56) References Cited

U.S. PATENT DOCUMENTS

2022/0032617 A1 2/2022 Murayama et al.
2022/0324225 A1 * 10/2022 Kobayashi .......... B41J 2/04588

FOREIGN PATENT DOCUMENTS

JP 2022-026566 A 2/2022

* cited by examiner

*Primary Examiner* — Lam S Nguyen
(74) *Attorney, Agent, or Firm* — WORKMAN NYDEGGER

(57) ABSTRACT

A drive waveform determination method determines a waveform of a drive pulse to be applied to a driven element provided in a liquid ejection head for ejecting a liquid and includes a first process of acquiring an exclusion condition and a second process of determining the waveform of the drive pulse based on multiple candidate waveforms and the exclusion condition.

16 Claims, 10 Drawing Sheets

DRIVE WAVEFORM DETERMINATION METHOD, DRIVE WAVEFORM DETERMINATION DEVICE, AND STORAGE MEDIUM

The present application is based on, and claims priority from JP Application Serial Number 2022-087910, filed May 30, 2022, the disclosure of which is hereby incorporated by reference herein in its entirety.

BACKGROUND

1. Technical Field

An aspect of the present disclosure relates to a drive waveform determination method, a drive waveform determination device, and a storage medium.

2. Related Art

Generally, in a liquid ejecting apparatus, such as an ink jet printer, a drive pulse is applied to a driven element, such as a piezoelectric element, to eject a liquid, such as ink, from a nozzle. Here, the waveform of the drive pulse is determined to achieve desired ejection characteristics of a head.

For example, JP-A-2022-026566 describes a method and a program for automatically generating a waveform of a drive pulse. The method described in JP-A-2022-026566 enables a user to select whether to automatically generate a waveform of a drive pulse or to manually generate a waveform of a drive pulse by the user.

In these years, there is a business model in which a head manufacturer sells only heads to a printer manufacturer. Even in such a business model, the method described in JP-A-2022-026566 makes it possible to determine a waveform of a drive pulse that can achieve optimum ejection characteristics considering various use conditions of a head by a user.

However, with the method described in JP-A-2022-026566, it is not possible to determine whether the determined waveform of the drive pulse is also desirable for conditions other than the ejection characteristics. For various reasons, there is a need to determine the waveform of a drive pulse also considering conditions other than ejection characteristics. However, the method described in JP-A-2022-026566 does not provide a method that satisfies such a need and therefore lacks usability.

SUMMARY

According to an aspect of the present disclosure, a drive waveform determination method determines a waveform of a drive pulse to be applied to a driven element provided in a liquid ejection head that ejects a liquid. The drive waveform determination method includes a first process of acquiring an exclusion condition and a second process of determining the waveform of the drive pulse based on multiple candidate waveforms and the exclusion condition.

According to an aspect of the present disclosure, a non-transitory computer-readable storage medium stores a drive waveform determination program for causing a computer to execute a process to determine a waveform of a drive pulse to be applied to a driven element provided in a liquid ejection head that ejects a liquid. The process includes a first process of acquiring an exclusion condition and a second process of determining the waveform of the drive pulse based on multiple candidate waveforms and the exclusion condition.

According to an aspect of the present disclosure, a drive waveform determination device determines a waveform of a drive pulse to be applied to a driven element provided in a liquid ejection head that ejects a liquid. The drive waveform determination device includes an acquisition unit that acquires an exclusion condition and a determination unit that determines the waveform of the drive pulse based on multiple candidate waveforms and the exclusion condition.

DESCRIPTION OF EXEMPLARY EMBODIMENTS

Figure 1:
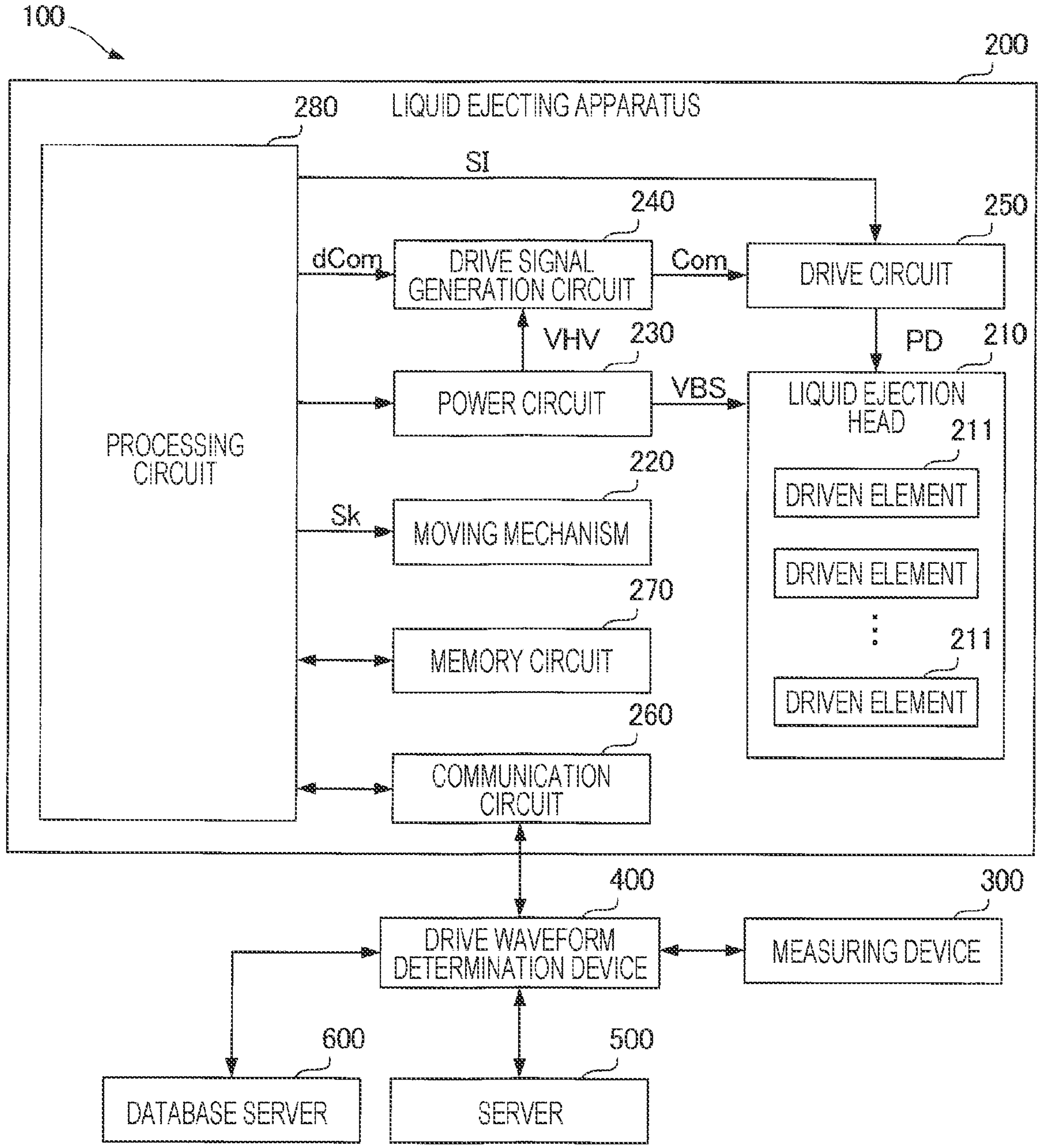
FIG. 1 is a schematic diagram illustrating an example of a configuration of a system including a drive waveform determination device according to a first embodiment.

Embodiments of the present disclosure are described below with reference to the accompanying drawings. The sizes and scales of components in the drawings may differ from the actual sizes and scales, and some parts of the drawings may be illustrated schematically to facilitate the understanding. Also, unless otherwise mentioned, the scope of the present disclosure is not limited to the embodiments described below.

1. FIRST EMBODIMENT

1-1. System Including Drive Waveform Determination Device

FIG. 1 is a schematic diagram illustrating an example of a configuration of a system 100 including a drive waveform determination device 400 according to a first embodiment. The system 100 determines the waveform of a drive pulse PD used to eject ink, which is an example of "liquid".

As illustrated in FIG. 1, the system 100 including a liquid ejecting apparatus 200, a measuring device 300, the drive waveform determination device 400, a server 500, and a database server 600.

Here, the liquid ejecting apparatus 200 is provided by a printer manufacturer. However, a liquid ejection head 210, which is described later and incorporated into the liquid ejecting apparatus 200, is provided by a head manufacturer different from the printer manufacturer. Also, the drive waveform determination device 400 may be owned by the user or provided by the printer manufacturer. The server 500 may be owned by either the head manufacturer or a web service provider other than the head manufacturer as long as the head manufacturer can provide services necessary for the user. The database server 600 is owned by a third party other than the printer manufacturer, the head manufacturer, the user, and the web service provider, and is maintained and managed by the third party.

When the printer manufacturer itself uses the liquid ejecting apparatus 200, the printer manufacturer is the user. When the printer manufacturer sells the liquid ejecting apparatus 200 to the third party and the third party uses the liquid ejecting apparatus 200, the third party is the user. When the server 500 is owned by a web service provider other than the head manufacturer, a processing device owned by the head manufacturer is connected to the server 500 via a communication network (not shown) to be able to communicate with the server 500.

In the system 100, the drive waveform determination device 400 determines the waveform of the drive pulse PD. This determination is made, for example, by driving the liquid ejecting apparatus 200 and the measuring device 300 as necessary and/or by using information from the measuring device 300, the server 500, and the database server 600 as necessary.

Below, a configuration of the liquid ejecting apparatus 200 and outlines of components of the system 100 other than the liquid ejecting apparatus 200 are described with reference to FIG. 1.

The liquid ejecting apparatus 200 is a printer that performs printing on a recording medium according to an ink jet method. The recording medium may be any type of medium on which the liquid ejecting apparatus 200 can perform printing. Examples of recording media include, but are not limited to, various types of paper, various types of cloth, and various types of films. The liquid ejecting apparatus 200 may be either a serial printer or a line printer.

As illustrated in FIG. 1, the liquid ejecting apparatus 200 includes a liquid ejection head 210, a moving mechanism 220, a power circuit 230, a drive signal generation circuit 240, a drive circuit 250, a communication circuit 260, a memory circuit 270, and a processing circuit 280.

The liquid ejection head 210 ejects ink toward a recording medium. In FIG. 1, multiple driven elements 211 are illustrated as components of the liquid ejection head 210. Although not illustrated in FIG. 1, the liquid ejection head 210 includes, in addition to the driven elements 211, cavities for storing ink and nozzles communicating with the cavities. Here, the driven element 211 is provided for each cavity and changes the pressure in the cavity to cause ink to be ejected from the nozzle corresponding to the cavity. The driven element 211 is, for example, a piezoelectric element that deforms a vibration plate constituting a part of the wall surface of the cavity or a heater that heats ink in the cavity. In the descriptions below, the liquid ejection head 210 may be simply referred to as a 'head'.

In the example illustrated in FIG. 1, the liquid ejecting apparatus 200 includes one liquid ejection head 210. However, the liquid ejecting apparatus 200 may include two or more liquid ejection heads 210. In this case, for example, two or more liquid ejection heads 210 are integrated as a unit. When the liquid ejecting apparatus 200 is a serial printer, the liquid ejection head 210 or a unit including two or more liquid ejection heads 210 is used such that multiple nozzles are distributed over a part of the width of the recording medium. When the liquid ejecting apparatus 200 is a line printer, a unit including two or more liquid ejection heads 210 is used such that multiple nozzles are distributed over the entire width of the recording medium.

The moving mechanism 220 changes the relative positions of the liquid ejection head 210 and the recording medium. More specifically, when the liquid ejecting apparatus 200 is a serial printer, the moving mechanism 220 includes a conveying mechanism that conveys the recording medium in a predetermined direction and a moving mechanism that repeatedly moves the liquid ejection head 210 along an axis that is orthogonal to the conveying direction of the recording medium. Also, when the liquid ejecting apparatus 200 is a line printer, the moving mechanism 220 includes a conveying mechanism that conveys the recording medium in a direction intersecting the longitudinal direction of a unit including two or more liquid ejection heads 210.

The power circuit 230 is supplied with power from a commercial power supply (not shown) and generates various predetermined potentials. The generated potentials are supplied to components of the liquid ejecting apparatus 200 as appropriate. For example, the power circuit 230 generates a power supply potential VHV and an offset potential VBS. The offset potential VBS is supplied to, for example, the liquid ejection head 210. Also, the power supply potential VHV is supplied to, for example, the drive signal generation circuit 240.

The drive signal generation circuit 240 generates a drive signal Com for driving each of the driven elements 211 of the liquid ejection head 210. Specifically, the drive signal generation circuit 240 includes, for example, a digital-to-analog (DA) conversion circuit and an amplifier circuit. In the drive signal generation circuit 240, the DA conversion circuit converts a digital waveform specification signal dCom (described later) received from the processing circuit 280 into an analog signal, and the amplifier circuit amplifies the analog signal by using the power supply potential VHV from the power circuit 230 to generate the drive signal Com. Here, a signal with a waveform, which is actually supplied to the driven element 211 out of waveforms included in the drive signal Com, is the drive pulse PD. The drive pulse PD is described in more detail later with reference to FIG. 2.

For each of the multiple driven elements 211, the drive circuit 250 determines, based on a control signal SI described later, whether to supply at least a part of the waveforms included in the drive signal Com as the drive pulse PD. The drive circuit 250 is implemented by, for example, a transmission gate.

The communication circuit 260 is a communication device that is connected to and is thereby enabled to communicate with the drive waveform determination device 400. The communication circuit 260 includes interfaces such as a universal serial bus (USB) interface and a local area network (LAN) interface. The communication circuit 260 may be wirelessly connected to the drive waveform determination device 400 via, for example, Wi-Fi or Bluetooth or may be connected to the drive waveform determination device 400 via a local area network (LAN) or the Internet. Each of Wi-Fi and Bluetooth is a registered trademark.

The memory circuit 270 stores various programs to be executed by the processing circuit 280 and various types of data, such as print data, to be processed by the processing circuit 280. The memory circuit 270 includes one or two types of semiconductor memories. For example, the memory circuit 270 includes one or both of a volatile memory, such as a random access memory (RAM), and a non-volatile memory, such as a read-only memory (ROM), an electrically erasable programmable read-only memory (EEPROM), or a programmable ROM (PROM). Print data is supplied from, for example, the drive waveform determination device 400. The memory circuit 270 may also be provided as a part of the processing circuit 280.

The processing circuit 280 includes a function for controlling the operations of components of the liquid ejecting apparatus 200 and a function for processing various types of data. The processing circuit 280 includes, for example, one or more processors such as central processing units (CPUs). The processing circuit 280 may include a programmable logic device, such as a field-programmable gate array (FPGA), instead of or in addition to the CPUs.

The processing circuit 280 controls the operations of components of the liquid ejecting apparatus 200 by executing programs stored in the memory circuit 270. The processing circuit 280 generates signals, such as control signals Sk and SI and the waveform specification signal dCom, for controlling the operations of components of the liquid ejecting apparatus 200.

The control signal Sk is for controlling the operation of the moving mechanism 220. The control signal SI is for controlling the operation of the drive circuit 250. Specifically, the control signal SI specifies, for each predetermined unit period, whether the drive circuit 250 supplies the drive signal Com from the drive signal generation circuit 240 to the liquid ejection head 210 as the drive pulse PD. This specification determines, for example, the amount of ink to be ejected from the liquid ejection head 210. The waveform specification signal dCom is a digital signal for specifying the waveform of the drive signal Com to be generated by the drive signal generation circuit 240.

The measuring device 300 measures the ejection characteristics of ink ejected from the liquid ejection head 210. The ejection characteristics include, for example, an ejection speed, an ejection angle, an ejection amount, the number of satellites, and stability. In the descriptions below, the ejection characteristics of ink ejected from the liquid ejection head 210 may be simply referred to as "ejection characteristics".

The measuring device 300 of the present embodiment is an imaging device that captures images of ink that is flying after being ejected from the liquid ejection head 210. Specifically, the measuring device 300 includes, for example, an imaging optical system and an image sensor. The imaging optical system includes at least one imaging lens, may include various optical elements such as a prism, and may include, for example, a zoom lens or a focus lens. The image sensor is, for example, a charge coupled device (CCD) image sensor or a complementary metal-oxide semiconductor (CMOS) image sensor. Imaging results of the image sensor are input to the drive waveform determination device 400. In the drive waveform determination device 400, various ejection characteristics are calculated by arithmetic processing using the imaging results. The measurement of ejection characteristics using the measuring device 300 is described later in more detail with reference to FIG. 3.

Among the ejection characteristics described above, the amount of ink may also be measured by using, instead of the measuring device 300, a device for capturing an image of ink landed on the recording medium or an electronic balance for measuring the mass of ink ejected from the liquid ejection head 210. The ejection characteristics may be any characteristics related to the state of ink ejected from the liquid ejection head 210 and may include, for example, the drive frequency or the residual vibration of the liquid ejection head 210 in addition to the characteristics described above. The residual vibration indicates vibration remaining in the ink channel in the liquid ejection head 210 after the driven element 211 is driven and is detected, for example, as a voltage signal from the driven element 211.

The drive waveform determination device 400 is a computer that controls the operations of the liquid ejecting apparatus 200 and the measuring device 300. Here, the drive waveform determination device 400 is connected wirelessly or via wire to each of the liquid ejecting apparatus 200, the measuring device 300, the server 500, and the database server 600 to enable mutual communication. This connection may involve a communication network including a LAN or the Internet.

The drive waveform determination device 400 includes, among other things, a function for determining the waveform of the drive pulse PD. The configuration of the drive waveform determination device 400 is described later in detail with reference to FIG. 4.

The server 500 is a computer that functions as a cloud server and, as appropriate, transmits and receives information necessary for the drive waveform determination device 400 to determine the waveform of the drive pulse PD. Specifically, the server 500, upon request from the drive waveform determination device 400, transmits a part or the entirety of exclusion condition information D5 described later or information necessary for the generation of the exclusion condition information D5 to the drive waveform determination device 400. Here, the server 500 may be provided as necessary and may be omitted.

The database server 600 is a computer that functions as a server including a database storing information on patent documents. The information is a part or the entirety of patent document information D6 described later or information necessary for the generation of the patent document information D6 and is obtained by the drive waveform determination device 400 as necessary. The database server 600 may be provided as necessary and may be omitted.

1-2. Drive Pulse

Figure 2:
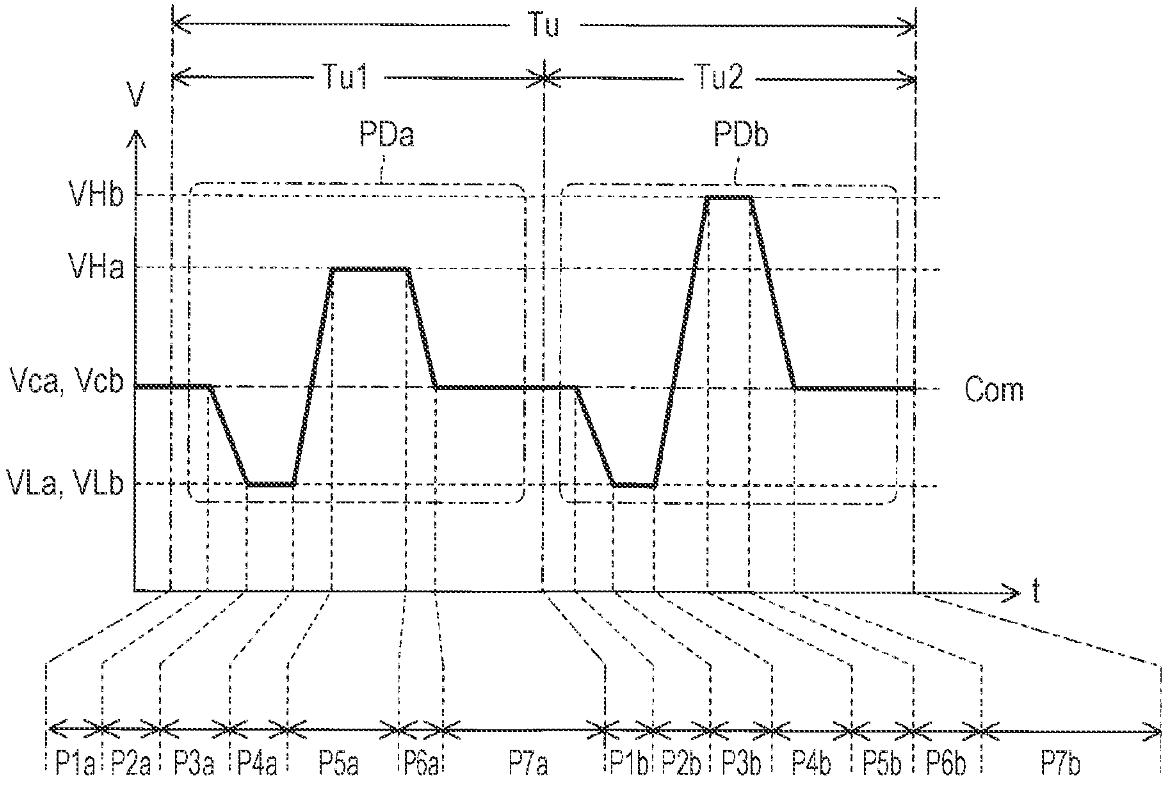
FIG. 2 is a drawing illustrating examples of waveforms of drive pulses.

FIG. 2 is a drawing illustrating examples of waveforms of drive pulses PD. In FIG. 2, the horizontal axis indicates a time t, and the vertical axis indicates a potential V. FIG. 2 illustrates temporal changes of the potential of the drive signal Com. As illustrated in FIG. 2, the drive signal Com includes a drive pulse PDa and a drive pulse PDb for each unit period Tu of a predetermined cycle. FIG. 2 illustrates examples of waveforms used when the driven element 211 is a piezoelectric element. The waveforms of the drive pulses PD are not limited to the examples illustrated in FIG. 2.

Each of the drive pulse PDa and the drive pulse PDb drives the driven element 211 to cause pressure variation in the pressure chamber of the liquid ejection head 210 with a force sufficient to cause ink to be ejected from the nozzle of the liquid ejection head 210. The unit period Tu is divided into a period Tu1 including the drive pulse PDa and a period Tu2 including the drive pulse PDb. In the descriptions below, each of the drive pulse PDa and the drive pulse PDb may be referred to as the drive pulse PD.

In the example illustrated in FIG. 2, the waveform of the drive pulse PDa in the period Tu1 changes from an intermediate potential Vca to a first potential VLa and to a second potential VHa in this order, and then returns to the intermediate potential Vca. The first potential VLa is lower than the intermediate potential Vca. In contrast, the second potential VHa is higher than the intermediate potential Vca. The intermediate potential Vca is a reference potential that is the offset potential VBS described above or obtained by applying a predetermined bias to the offset potential VBS.

Here, the waveform of the drive pulse PDa includes, between the starting point and the end point, a first period P1*a*, a second period P2*a*, a third period P3*a*, a fourth period P4*a*, a fifth period P5*a*, a sixth period P6*a*, and a seventh period P7*a* in this order. In the first period P1*a*, the potential is maintained at the intermediate potential VCa. In the second period P2*a*, the potential is decreased from the intermediate potential VCa to the first potential VLa. In the third period P3*a*, the potential is maintained at the first potential VLa. In the fourth period P4*a*, the potential is increased from the first potential VLa to the second potential VHa. In the fifth period P5*a*, the potential is maintained at the second potential VHa. In the sixth period P6*a*, the potential is decreased from the second potential VHa to the intermediate potential Vca. In the seventh period P7*a*, the potential is maintained at the intermediate potential Vca. Here, the starting point of the waveform of the drive pulse PDa is the starting point of the period Tu1. The end point of the waveform of the drive pulse PDa is the end point of the period Tu1.

The above-described drive pulse PDa changes from the intermediate potential Vca to the first potential VLa to increase the volume of the pressure chamber of the liquid ejection head 210, and changes from the first potential VLa to the second potential VHa to sharply decrease the volume of the pressure chamber. As a result of the change in the volume of the pressure chamber, a portion of ink in the pressure chamber is ejected as a liquid droplet from the nozzle of the liquid ejection head 210.

In contrast, the waveform of the drive pulse PDb in the period Tu2 changes from an intermediate potential Vcb to a first potential VLb and to a second potential VHb in this order and then returns to the intermediate potential Vcb. The first potential VLb is lower than the intermediate potential Vcb. In contrast, the second potential VHb is higher than the intermediate potential Vcb. Here, the potential difference between the first potential VLb and the second potential VHb is greater than the potential difference between the first potential VLa and the second potential VHa. In the example illustrated in FIG. 2, the first potential VLb is equal to the first potential VLa, but the second potential VHb is higher than the second potential VHa. The intermediate potential Vcb is equal to the intermediate potential Vca. The potentials of parts of the drive pulse PDb are not limited to the examples illustrated in FIG. 2. For example, the first potential VLb may be different from the first potential VLa, and the intermediate potential Vcb may be different from the intermediate potential Vca.

Here, the waveform of the drive pulse PDb includes, between the starting point and the end point, a first period P1*b*, a second period P2*b*, a third period P3*b*, a fourth period P4*b*, a fifth period P5*b*, a sixth period P6*b*, and a seventh period P7*b* in this order. In the first period P1*b*, the potential is maintained at the intermediate potential VCb. In the second period P2*b*, the potential is decreased from the intermediate potential VCb to the first potential VLb. In the third period P3*b*, the potential is maintained at the first potential VLb. In the fourth period P4*b*, the potential is increased from the first potential VLb to the second potential VHb. In the fifth period P5*b*, the potential is maintained at the second potential VHb. In the sixth period P6*b*, the potential is decreased from the second potential VHb to the intermediate potential Vcb. In the seventh period P7*b*, the potential is maintained at the intermediate potential Vcb. Here, the starting point of the waveform of the drive pulse PDb is the starting point of the period Tu2. Also, the end point of the waveform of the drive pulse PDb is the end point of the period Tu2.

The above-described drive pulse PDb changes from the intermediate potential Vcb to the first potential VLb to increase the volume of the pressure chamber of the liquid ejection head 210, and changes from the first potential VLb to the second potential VHb to sharply decrease the volume of the pressure chamber. As a result of the change in the volume of the pressure chamber, a portion of ink in the pressure chamber is ejected as a liquid droplet from the nozzle of the liquid ejection head 210.

Here, because the potential difference between the first potential VLb and the second potential VHb is greater than the potential difference between the first potential VLa and the second potential VHa as described above, the amount of liquid ejected from the nozzle by using the drive pulse PDb is greater than the amount of liquid ejected from the nozzle by using the drive pulse PDa. Therefore, when a dot formed by ink ejected from the liquid ejection head 210 by using the drive pulse PDa has a first size, a dot formed by ink ejected from the liquid ejection head 210 by using the drive pulse PDb has a second size that is larger than the first size.

The ejection characteristics of ink ejected from the liquid ejection head 210 can be adjusted by changing the potentials or the periods in each of the drive pulse PDa and the drive pulse PDb described above.

1-3. Measurement of Ejection Characteristics

Figure 3:
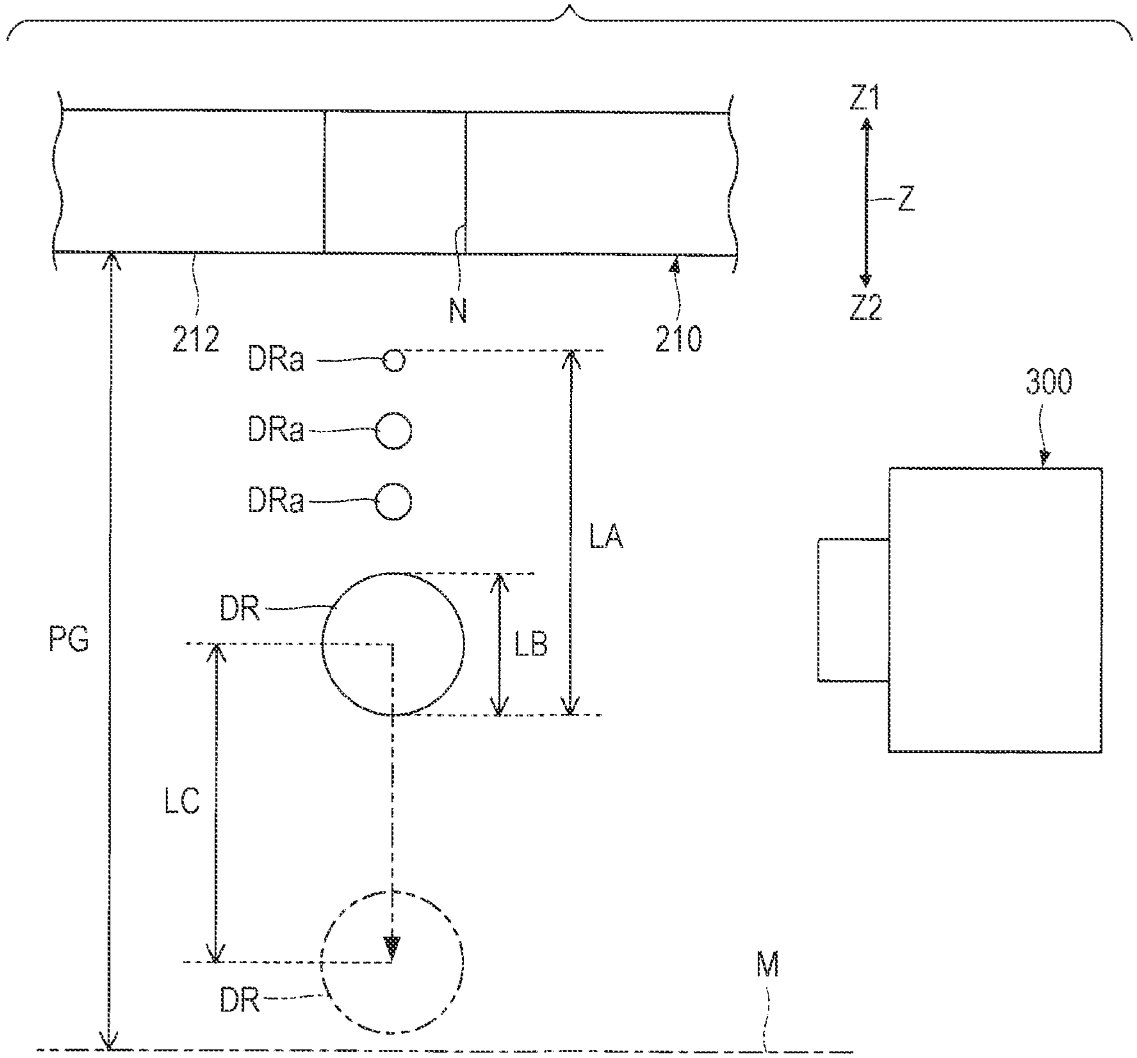
FIG. 3 is a drawing used to describe measurement of ejection characteristics.

FIG. 3 is a drawing used to describe measurement of ejection characteristics. As illustrated in FIG. 3, the measuring device 300 captures an image of a state of a liquid droplet DR of ink that is flying after being ejected from a nozzle N of the liquid ejection head 210, from a direction that is orthogonal to or intersects the ejection direction.

In the example illustrated in FIG. 3, the liquid ejection head 210 has a nozzle face 212 in which the opening of the nozzle N is present. The nozzle face 212 is normally disposed to be parallel to the printing surface of a recording medium M.

The liquid droplet DR is a main liquid droplet ejected from the nozzle N. In the example illustrated in FIG. 3, in addition to the liquid droplet DR, multiple liquid droplets DRa, which are called satellites and are generated subsequent to the liquid droplet DR as a result of the generation of the liquid droplet DR, are ejected from the nozzle N. The liquid droplets DRa are smaller in diameter than the liquid droplet DR. Whether the liquid droplets DRa are generated and the number or sizes of the liquid droplets DRa depend on, for example, the type of ink or the waveform of the drive pulse PD.

The measuring device 300 captures images of the flying liquid droplet DR continuously or intermittently at a very short time interval. Based on the captured images, the timing at which the liquid droplet DR reaches the recording medium M can be measured. Also, it is possible to measure the position of the liquid droplet DR at each predetermined time point based on the measurement results of the measuring device 300 and to measure the ejection direction, the ejection speed, or the landing position of the liquid droplet DR based on the positions of the liquid droplet DR at multiple time points. Furthermore, when multiple liquid droplets DR are consecutively ejected from the nozzle N, it is possible to measure whether the multiple liquid droplets DR are combined and to measure the order in which the multiple liquid droplets DR are combined based on the measurement results of the measuring device 300.

The timing at which the flying distance of the liquid droplet DR from the liquid ejection head 210 reaches a predetermined distance may be calculated based on the time at which the flying distance of the liquid droplet DR actually reached the predetermined distance or may be calculated based on the ejection speed of the liquid droplet DR and the predetermined distance. When the predetermined distance is a distance PG between the nozzle face 212 and the recording medium M, the timing at which the liquid droplet DR reaches the recording medium M is measured.

The ejection amount indicating the amount of the liquid droplet DR ejected from the liquid ejection head 210 is calculated, for example, as the volume of the liquid droplet DR based on a diameter LB of the liquid droplet DR by using an image captured by the measuring device 300. Also, the ejection speed of the liquid droplet DR ejected from the liquid ejection head 210 is calculated based on, for example, a distance LC and a time between any two positions of the flying liquid droplet DR. In FIG. 3, the liquid droplet DR after the predetermined time is indicated by a dashed-two dotted line. Also, an aspect ratio (LA/LB) of ink ejected from the liquid ejection head 210 can be calculated as an ejection characteristic of the ink. Furthermore, the ejection angle of ink ejected from the liquid ejection head 210 may be obtained based on the relationship between the position of the liquid droplet DR before the predetermined time and the position of the liquid droplet DR after the predetermined time. The amount of the liquid droplet DR ejected from the liquid ejection head 210 may also be calculated as the mass of the liquid droplet DR based on the diameter LB of the liquid droplet DR and the density of the liquid droplet DR.

1-4. Drive Waveform Determination Device

Figure 4:
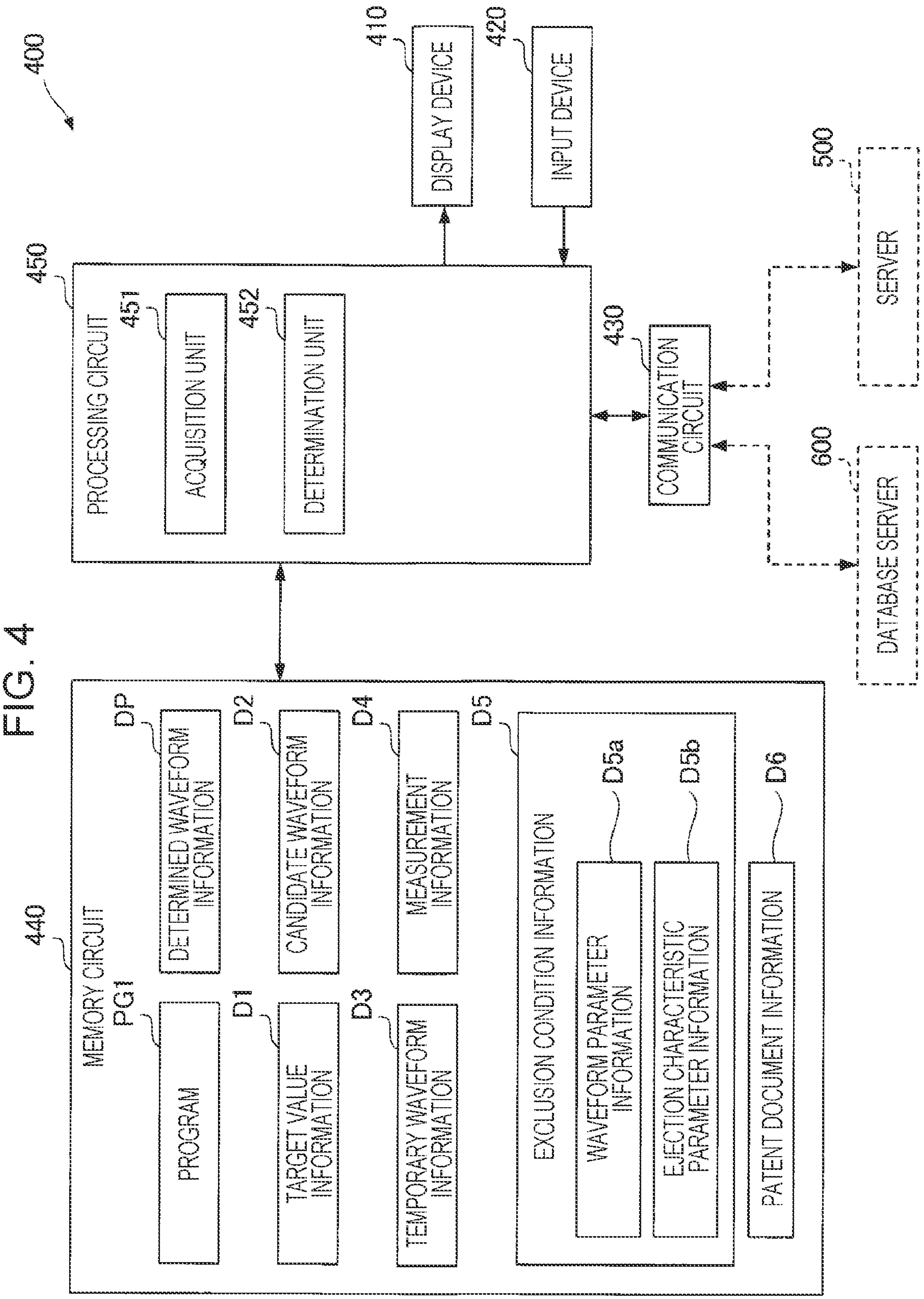
FIG. 4 is a drawing illustrating a drive waveform determination device according to the first embodiment.

FIG. 4 is a drawing illustrating the drive waveform determination device 400 according to the first embodiment. As illustrated in FIG. 4, the drive waveform determination device 400 includes a display device 410 that is an example of a "display unit", an input device 420, a communication circuit 430, a memory circuit 440 that is an example of a "storage unit", and a processing circuit 450. These components are connected to be able to communicate with each other.

The display device 410 displays various images under the control of the processing circuit 450. The display device 410 includes, for example, a type of display panel such as a liquid crystal display panel or an organic electroluminescence (EL) display panel. The display device 410 may instead be provided outside of the drive waveform determination device 400. The display device 410 may also be a component of the liquid ejecting apparatus 200.

The input device 420 receives user operations. For example, the input device 420 includes a pointing device, such as a touch pad, a touch panel, or a mouse. When the input device 420 includes a touch panel, the input device 420 may also serve as the display device 410. The input device 420 may instead be provided outside of the drive waveform determination device 400. Also, the input device 420 may be a component of the liquid ejecting apparatus 200.

The communication circuit 430 is a communication device that is connected to and is thereby enabled to communicate with each of the liquid ejecting apparatus 200 and the measuring device 300. The communication circuit 430 includes interfaces such as a USB interface and a LAN interface. The communication circuit 430 may be wirelessly connected to the liquid ejecting apparatus 200 or the measuring device 300 via, for example, Wi-Fi or Bluetooth, or may be connected to the liquid ejecting apparatus 200 or the measuring device 300 via a local area network (LAN) or the Internet.

The memory circuit 440 stores various programs to be executed by the processing circuit 450 and various types of data to be processed by the processing circuit 450. For example, the memory circuit 440 includes a hard disk drive or a semiconductor memory. A part or the entirety of the memory circuit 440 may be provided in a storage device or a server outside of the drive waveform determination device 400.

The memory circuit 440 of the present embodiment stores a program PG1 that is an example of a "drive waveform determination program", target value information D1, candidate waveform information D2, tentative waveform information D3, measurement information D4, exclusion condition information D5, determined waveform information DP, and patent document information D6. The memory circuit 440 may also store information other than the above-described information and programs. For example, the memory circuit 440 may store, as appropriate, waveforms used for measurement performed by the measuring device 300 and information on measurement conditions such as a temperature.

Each of the candidate waveform information D2, the tentative waveform information D3, and the determined waveform information DP includes parameters such as a voltage, a potential, and a potential gradient defining a waveform and indicates a waveform of the drive pulse PD.

Here, the candidate waveform information D2 and the tentative waveform information D3 are used to generate the determined waveform information DP. More specifically, the candidate waveform information D2 indicates multiple candidate waveforms that are different from each other and is generated by an acquisition unit 451 described later based on, for example, the target value information D1. The tentative waveform information D3 indicates at least one tentative waveform and is generated by a determination unit 452 described later based on some candidate waveforms that are among the multiple candidate waveforms indicated by the candidate waveform information D2 and do not satisfy exclusion conditions indicated by the exclusion condition information D5. The determined waveform information DP indicates at least one waveform and is generated by the determination unit 452 described later based on the at least one tentative waveform indicated by the tentative waveform information D3. For example, the determined waveform information DP indicates various parameters for defining the waveform of the drive pulse PD.

The target value information D1 is setting information regarding target values of ejection characteristics and is generated by the acquisition unit 451 described later based on user input. The ejection characteristics indicated by the target value information D1 includes, for example, an ejection amount indicating the amount of liquid ejected each time from the liquid ejection head 210, a drive frequency of the liquid ejection head 210, and an ejection speed of the main liquid droplet ejected from the liquid ejection head 210.

The measurement information D4 indicates ejection characteristics based on the measurement results of the measuring device 300. In addition to the information on the measurement results of the measuring device 300, the measurement information D4 may include information on measurement conditions used by the measuring device 300, such as information indicating waveforms of the drive pulse PD used for the measurement.

The exclusion condition information D5 indicates exclusion conditions indicating waveforms that need to be excluded from waveforms to be indicated by the determined waveform information DP. The exclusion conditions may be freely set by the user, may be stored in advance or additionally entered by the head manufacturer in the memory circuit 440 or a memory of the liquid ejection head 210, or may be collected automatically. In the example illustrated in FIG. 4, the exclusion condition information D5 includes waveform parameter information D5*a* and ejection characteristic parameter information D5*b*. Examples of the exclusion condition information D5 are described later.

The waveform parameter information D5*a* indicates parameters such as voltages, potentials, and potential gradients that define waveforms. The ejection characteristic parameter information D5*b* indicates parameters related to ejection characteristics such as an ejection speed, an ejection angle, an ejection amount, the number of satellites, and stability.

The patent document information D6 is related to patent documents and includes parameters indicating waveforms or ejection characteristics that are related to active patents. The patent document information D6 is input from the database server 600 based on information set by the user and acquired by the acquisition unit 451 described later. The patent document information D6 at least includes information on patent publications issued when patents are registered and/or patent application publications issued when patent applications are made public. The patent document information D6 may be omitted.

The program PG1 provides the processing circuit 450 with various functions for determining the waveform of the drive pulse PD. The various functions include the functions of the acquisition unit 451 and the determination unit 452 described later.

The processing circuit 450 includes functions for controlling the components of the drive waveform determination device 400, the liquid ejecting apparatus 200, and the measuring device 300 and functions for processing various types of data. The processing circuit 450 includes, for example, a processor such as a central processing unit (CPU). The processing circuit 450 may be constituted by a single processor or multiple processors. Also, some or all of the functions of the processing circuit 450 may be implemented by hardware, such as a digital signal processor (DSP), an application specific integrated circuit (ASIC), a programmable logic device (PLD), or a field programmable gate array (FPGA).

The processing circuit 450 executes the program PG1 read from the memory circuit 440 and thereby functions as the acquisition unit 451 and the determination unit 452.

The acquisition unit 451 makes settings necessary to determine the waveform of the drive pulse PD and acquires exclusion conditions. Specifically, the acquisition unit 451 displays, on the display device 410, images for graphical user interfaces (GUI) used to make settings and receives input related to the target value information D1 and the exclusion condition information D5 according to operations of the input device 420 based on the images, and generates the target value information D1 and the exclusion condition information D5.

In the present embodiment, the acquisition unit 451 displays, on the display device 410, an image G2 described later as a GUI for inputting the target value information D1. Also, the acquisition unit 451 displays, on the display device 410, an image G1 described later as a GUI for inputting the exclusion condition information D5.

The determination unit 452 determines the waveform of the drive pulse PD based on the setting results and the acquisition results of the acquisition unit 451. In the present embodiment, the determination unit 452 first generates the candidate waveform information D2 based on the target value information D1. Next, the determination unit 452 generates the measurement information D4 by causing the measuring device 300 to perform measurement based on the candidate waveform information D2. Next, the determination unit 452 generates the tentative waveform information D3 based on the target value information D1 and the measurement information D4, and then adjusts the tentative waveform information D3 based on the exclusion condition information D5. Then, the determination unit 452 generates the determined waveform information DP based on the adjusted tentative waveform information D3. The waveform indicated by the determined waveform information DP may be the same as the waveform indicated by the adjusted tentative waveform information D3 or may be obtained by further adjusting the waveform indicated by the adjusted tentative waveform information D3 according to, for example, user operations. Thus, the determination unit 452 determines the waveform of the drive pulse PD based on multiple candidate waveforms and exclusion conditions.

Here, when the at least one tentative waveform indicated by the tentative waveform information D3 includes a waveform that satisfies an exclusion condition indicated by the exclusion condition information D5, the determination unit 452 displays a screen to that effect on the display device 410. As indicated by an image G3 in FIG. 6 described later, the displayed screen can receive user input for selecting whether to use the waveform satisfying the exclusion condition for the determination of the waveform of the drive pulse PD. For example, when a waveform for which the user has a patent or a right to license the patent is displayed as the tentative waveform satisfying the exclusion condition, the user may choose not to exclude the waveform.

1-5. Determination of Waveform of Drive Pulse

Figure 5:
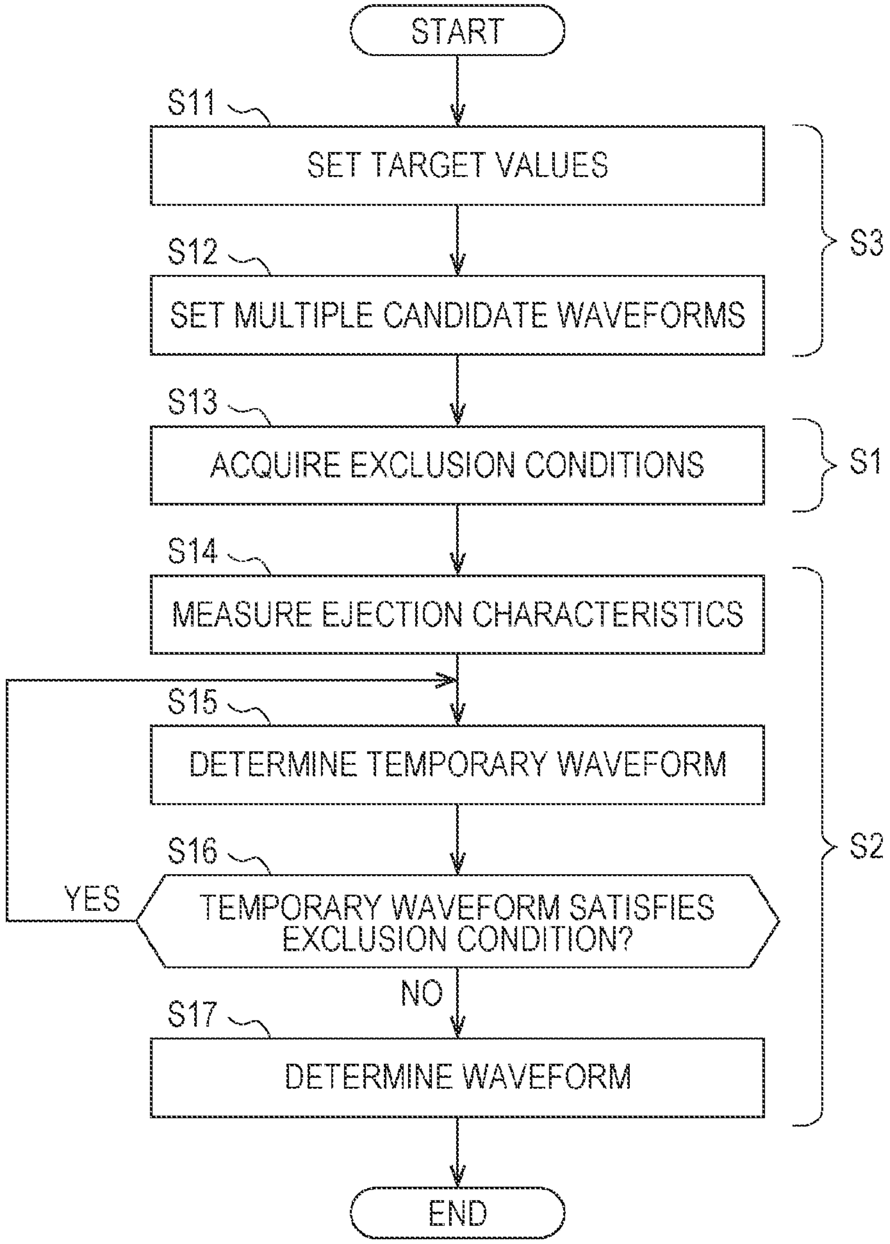
FIG. 5 is a flowchart illustrating a drive waveform determination method according to the first embodiment.

FIG. 5 is a flowchart illustrating a drive waveform determination method according to the first embodiment. The drive waveform determination method includes a third process S3 of displaying an image for making settings, a first process S1 of acquiring exclusion conditions, and a second process S2 of determining the waveform of the drive pulse PD that are performed in this order.

In the third process S3, the acquisition unit 451 displays, on the display device 410, an image GU described later for making various settings necessary to determine the waveform of the drive pulse PD and makes the various settings. Specifically, at step S11 in the third process S3, the acquisition unit 451 first sets target values and thereby generates the target value information D1. The setting of the target values is performed based on input using an image G2 in the image GU described later. Next, at step S12, the acquisition unit 451 sets multiple candidate waveforms and thereby generates the candidate waveform information D2. The multiple candidate waveforms are set by using a waveform generation program that automatically generates multiple waveforms according to the target values. Alternatively, the multiple candidate waveforms may be manually set by the user.

In the first process S1, the acquisition unit 451 acquires exclusion conditions. Specifically, at step S13 in the first process S1, the acquisition unit 451 acquires exclusion conditions and thereby generates the exclusion condition information D5. The exclusion conditions are acquired from one or more of input by the user via the image G1, input from the server 500, input from the memory circuit 440 of the drive waveform determination device 400 or a memory (not shown) of the liquid ejection head 210, and input from the database server 600. For the generation of the exclusion condition information D5, the patent document information D6 from the server 500 or the database server 600 is used as necessary. Step S13 may instead be performed between step S15 and step S16 described later.

In the second process S2, the determination unit 452 determines the waveform of the drive pulse PD. Specifically, at step S14 in the second process S2, the determination unit 452 first acquires ejection characteristics of the liquid ejection head 210 by using each of the multiple candidate waveforms indicated by the candidate waveform information D2 as the waveform of the drive pulse PD and thereby generates the measurement information D4. The ejection characteristics may be acquired based on the results of measurement performed by the measuring device 300 while driving the liquid ejecting apparatus 200 by using each of the multiple candidate waveforms indicated by the candidate waveform information D2 as the waveform of the drive pulse PD or may be acquired based on the results of simulation of the ejection characteristics performed by using each of the multiple candidate waveforms indicated by the candidate waveform information D2 as the waveform of the drive pulse PD.

Next, at step S15, the determination unit 452 determines at least one tentative waveform based on the ejection characteristics indicated by the measurement information D4 and thereby generates the tentative waveform information D3. The determination of the tentative waveform may be performed by automatically selecting, as the tentative waveform, a candidate waveform providing optimum ejection characteristics, such as the ejection amount, the ejection speed, and the stability, from the multiple candidate waveforms indicated by the candidate waveform information D2, or by notifying the user of two or more candidate waveforms in a Pareto relationship out of the multiple candidate waveforms indicated by the candidate waveform information D2 and requesting the user to select a candidate waveform from the two or more candidate waveforms as the tentative waveform.

Next, at step S16, the determination unit 452 determines whether each of the at least one tentative waveform indicated by the tentative waveform information D3 satisfies an exclusion condition. When each of the at least one tentative waveform indicated by the tentative waveform information D3 satisfies an exclusion condition, the determination unit 452 returns to step S15 and determines again a tentative waveform different from the at least one tentative waveform. For example, a candidate waveform with second optimum ejection characteristics may be determined as the next tentative waveform. On the other hand, when any of the at least one tentative waveform indicated by the tentative waveform information D3 does not satisfy the exclusion conditions, the determination unit 452 determines, at step S17, the waveform of the drive pulse PD by using a tentative waveform in the at least one tentative waveform that does not satisfy the exclusion conditions based on the result of determination at step S16 and thereby generates the determined waveform information DP.

When No is selected in an input section G3*a* and Yes is selected in an input section G3*b* illustrated in FIG. 6 described later and each of the at least one tentative waveform indicated by the tentative waveform information D3 satisfies an exclusion condition at step S16, the determination unit 452 causes the display device 410 to display an image requesting input indicating whether to allow the use of the waveform that satisfies the exclusion condition. When the use of the waveform satisfying the exclusion condition is allowed, the determination unit 452 proceeds to step S17. In contrast, when the use of the waveform satisfying the exclusion condition is not allowed, the determination unit 452 returns to step S15.

1-6. GUI Image

An image for a graphical user interface (GUI) for inputting various types of information necessary to determine the waveform of the drive pulse PD in the third process S3, the first process S1, and the second process S2 is displayed on the display device 410 of the drive waveform determination device 400. Details of each process are described below with reference to a specific example of this image.

Figure 6:
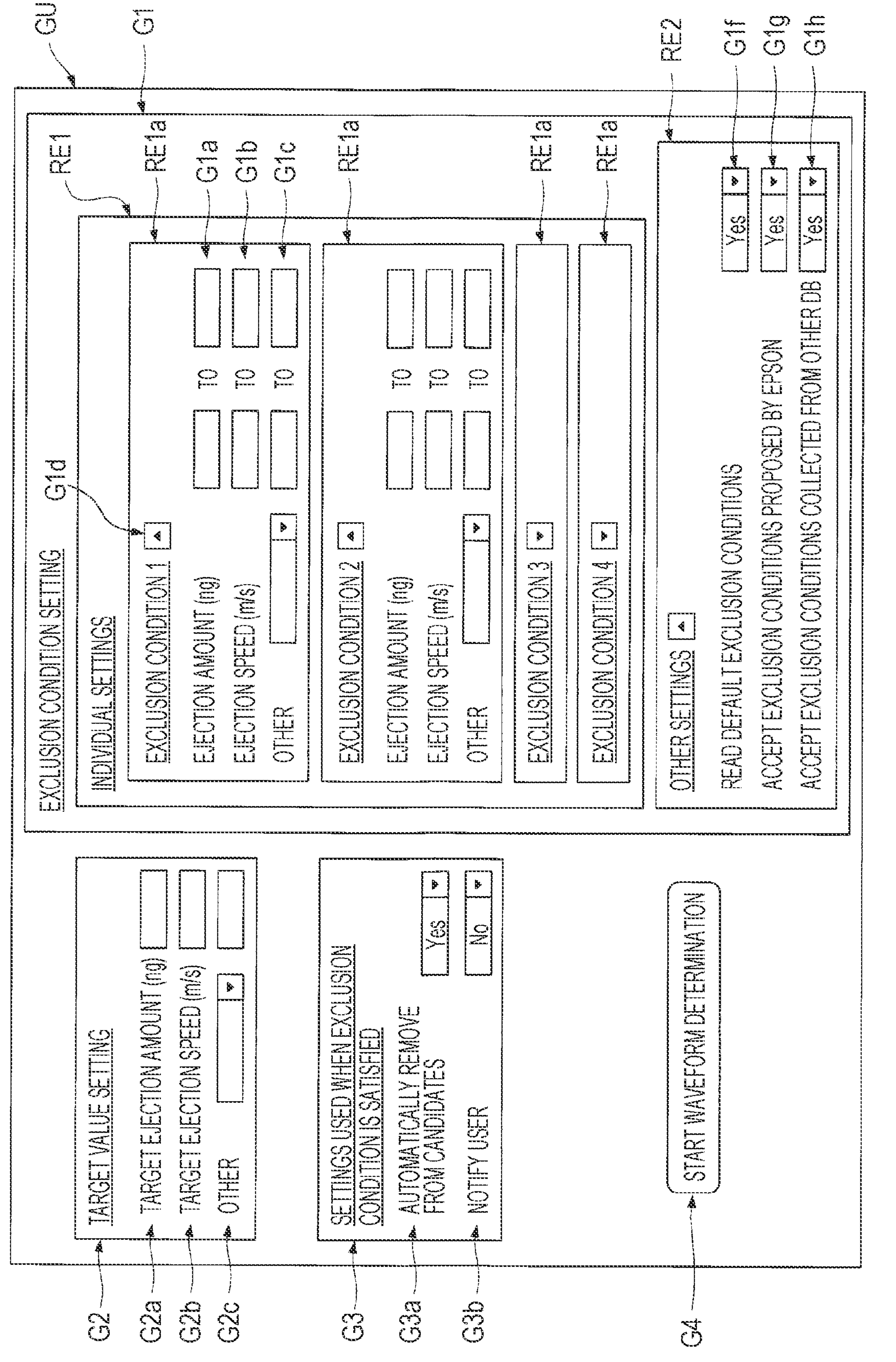
FIG. 6 is a drawing illustrating an image displayed on a display device of a drive waveform determination device.

FIG. 6 illustrates an image GU displayed on the display device 410 of the drive waveform determination device 400. The image GU is for a GUI for inputting various types of information necessary to determine the waveform of the drive pulse PD. The image GU includes an image G1, an image G2, an image G3, and an image G4.

The image G1 is used to make settings related to exclusion conditions. Based on the settings, exclusion conditions are acquired at step S13. The image G1 is divided into a region RE1 and a region RE2.

The region RE1 is used to set exclusion conditions at the discretion of the user and includes multiple regions RE1*a* for setting exclusion conditions related to ejection characteristics and waveforms. In the example illustrated in FIG. 6, the region RE1 includes four regions RE1*a*. Each region RE1*a* includes an input section G1*a*, an input section G1*b*, an input section G1*c*, and a button G1*d*. The input section G1*a* is an input field for setting a range of ejection amount to be excluded. The input section G1*b* is an input field for setting a range of ejection speed to be excluded. That is, the input sections G1*a* and G1*b* are used to enable the user to input a part of the ejection characteristic parameter information D5*b* to be excluded. The input section G1*c* is an input field for setting a range of any other ejection characteristic or waveform to be excluded. Although omitted in FIG. 6, when a drop-down list in the input section G1*c* is clicked, a list of items for defining a waveform, such as a voltage, a potential, a potential gradient, an ejection angle, the number of satellites, and stability, is displayed, and the user can select one of the items. The input section G1*c* also includes an input field for setting a range of the selected item to be excluded. In other words, the input section G1*c* is used to allow the user to input a part of the waveform parameter information D5*a* or the ejection characteristic parameter information D5*b* to be excluded. The button G1*d* is used to collapse or expand the region RE1*a*. As is apparent from the fact that multiple regions RE1*a* are provided, the user can input multiple exclusion conditions at one time.

The region RE2 is for making other settings related to exclusion conditions and includes an input section G1*f*, an input section G1*g*, and an input section G1*h*.

The input section G1*f* is a drop-down list for selecting whether to input exclusion conditions based on information stored in advance in, for example, the memory circuit 440.

For example, these exclusion conditions include ranges in the waveform parameter information D5*a* and the ejection characteristic parameter information D5*b* that are prestored by the head manufacturer and may cause the risk of patent infringement (examples of conditions related to patent documents). In this case, the exclusion conditions correspond to waveforms and ejection characteristics that have been made public or registered and for which the risk of patent infringement has been recognizable at the time when the liquid ejection head 210 is manufactured and sold by the head manufacturer.

The input section G1*g* is a drop-down list for selecting whether to input exclusion conditions based on information from the server 500. For example, these exclusion conditions are ranges in the waveform parameter information D5*a* and the ejection characteristic parameter information D5*b* that are additionally input by the head manufacturer after manufacturing and selling the head and that may cause the risk of patent infringement (examples of conditions related to patent documents). In this case, the exclusion conditions correspond to waveforms and ejection characteristics that are made public or registered after the liquid ejection head 210 is manufactured and sold by the head manufacturer and for which the risk of patent infringement has not been recognized at that time.

The input section G1*h* is a drop-down list for selecting whether to input exclusion conditions based on information from the database server 600. These exclusion conditions correspond to the patent document information D6 that is collected from the database server 600 and stored in the memory circuit 440.

The image G2 is used to input target values. Based on user input on the image G2, target values are set at step S11. The image G2 includes an input section G2*a*, an input section G2*b*, and an input section G2*c*. The input section G2*a* is an input field for setting a target ejection amount. The input section G2*b* is an input field for setting a target ejection speed. The input section G2*c* is an input field for setting a target value of any other ejection characteristic or waveform.

The image G3 is a region for making settings related to processes performed when a candidate waveform satisfies an exclusion condition and includes the input section G3*a* and the input section G3*b*. The input section G3*a* is a drop-down list for selecting whether to automatically delete a candidate waveform satisfying an exclusion condition. When the input section G3*a* is set to Yes and a candidate waveform set at step S12 satisfies an exclusion condition, the candidate waveform is not used for waveform application, ejection, and measurement performed at step S14. That is, when the input section G3*a* is set to Yes, the temporal waveform determined at step S15 does not satisfy any exclusion condition. When the input section G3*a* is set to No, even if a candidate waveform satisfies an exclusion condition, the candidate waveform is not automatically deleted. The input section G3*b* is a drop-down list for selecting whether to notify the user that a candidate waveform satisfies an exclusion condition. When the input section G3*b* is set to Yes and a candidate waveform satisfies an exclusion condition, the user is notified to that effect. For example, when the input section G3*a* is set to No and the input section G3*b* is set to Yes, a step may be added to notify the user that a candidate waveform satisfies an exclusion condition and request the user to select whether to use the candidate waveform. When the input section G3*b* is set to No, the user is not notified even when a candidate waveform satisfies an exclusion condition.

The image G4 is a button for starting a process of determining the waveform of the drive pulse PD based on the settings input on the images G1 through G3.

As described above, the determination of the waveform of the drive pulse PD is started after the target value information D1 and the exclusion condition information D5 are generated by using the image GU. As long as the settings necessary for the determination of the waveform of the drive pulse PD using the target value information D1 and the exclusion condition information D5 can be made, the image GU is not limited to the example illustrated in FIG. 6.

As described above, the drive waveform determination method is performed to determine the waveform of the drive pulse PD to be applied to the driven element 211 of the liquid ejection head 210 that ejects ink, which is an example of a "liquid".

The drive waveform determination method of the present embodiment includes the first process S1 and the second process S2. The first process S1 acquires exclusion conditions indicated by the exclusion condition information D5. The second process S2 determines the waveform of the drive pulse PD based on the multiple candidate waveforms indicated by the candidate waveform information D2 and the exclusion conditions.

In the drive waveform determination method described above, because the waveform of the drive pulse PD is determined based on the multiple candidate waveforms and the exclusion conditions, waveforms satisfying the exclusion conditions are excluded in determining the waveform of the drive pulse PD. Here, using conditions other than the ejection characteristics as the exclusion conditions makes it possible to determine a waveform of the drive pulse PD that is appropriate in terms of the conditions other than the ejection characteristics in addition to the ejection characteristics. This eliminates the need for the user to contact the head manufacturer to inquire about the conditions other than the ejection characteristic or to find out the conditions by himself/herself. This in turn makes it possible to reduce the load of the user compared with the related art and thereby makes it possible to achieve excellent usability.

Also, as described above, in the first process S1 of the drive waveform determination method of the present embodiment, conditions related to patent documents are acquired as exclusion conditions. This makes it possible to determine the waveform of the drive pulse PD so as not to infringe patents.

Also, as described above, in the second process S2 of the drive waveform determination method of the present embodiment, when some of multiple candidate waveforms indicated by the candidate waveform information D2 satisfy exclusion conditions indicated by the exclusion condition information D5, the some of the multiple candidate waveforms are excluded in determining the waveform of the drive pulse PD. This in turn makes it possible to determine a waveform of the drive pulse PD that does not satisfy the exclusion conditions.

Also, as described above, in the second process S2 of the drive waveform determination method of the present embodiment, when some of multiple candidate waveforms indicated by the candidate waveform information D2 satisfy exclusion conditions indicated by the exclusion condition information D5, the user is notified to that effect. This enables the user to recognize risks indicated by the exclusion conditions.

Furthermore, as described above, in the second process S2 of the drive waveform determination method of the present embodiment, ejection characteristics of the liquid ejection head 210 are acquired by using each of multiple candidate waveforms indicated by the candidate waveform information D2 as the waveform of the drive pulse PD, at least one tentative waveform is determined based on the ejection characteristics, whether each of the at least one tentative waveform satisfies any of the exclusion conditions is determined, and the waveform of the drive pulse PD is determined based on the determination result by using a tentative waveform out of the at least one tentative waveform that does not satisfy the exclusion condition. Accordingly, compared to a case in which whether any of the exclusion conditions is satisfied is determined for each of the multiple candidate waveforms, this method makes it possible to reduce the load of processor processing for determining whether the exclusion conditions are satisfied.

Also, as described above, in the second process S2 of the drive waveform determination method of the present embodiment, some of the candidate waveforms indicated by the candidate waveform information D2 are selected based on the ejection characteristics of the liquid ejection head 210 and the exclusion conditions indicated by the exclusion condition information D5, the some of the candidate waveforms are notified to the user, and the waveform of the drive pulse PD is determined based on at least one candidate waveform selected by the user from the some of the candidate waveforms. This makes it possible to increase the freedom of choice of the user in determining the waveform of the drive pulse PD.

Furthermore, as described above, in the first process S1 of the drive waveform determination method of the present embodiment, the drive waveform determination device 400, which is an example of a client used by the user, receives input of exclusion conditions indicated by the exclusion condition information D5 and thereby acquires the exclusion conditions. This enables the user to set the exclusion conditions.

Also, as described above, the drive waveform determination method of the present embodiment further includes the third process S3 in which the image G1, which is used by the drive waveform determination device 400 to receive input of exclusion conditions indicated by the exclusion condition information D5, is displayed on the display device 410 that is an example of a "display unit". Displaying the image G1 on the display device 410 makes it possible to reduce the load of the user in inputting exclusion conditions.

Furthermore, as described above, in the first process S1 of the drive waveform determination method of the present embodiment, exclusion conditions indicated by the exclusion condition information D5 are acquired by receiving the input of the exclusion conditions at the server 500 that is connected to and is able to communicate with the drive waveform determination device 400, which is an example of a client used by the user. This enables, for example, the head manufacturer to set the exclusion conditions.

Also, as described above, in the first process S1 of the drive waveform determination method of the present embodiment, exclusion conditions stored in advance in the memory circuit 440, which is an example of a "storage unit", are read to acquire the exclusion conditions. This makes it possible to use exclusion conditions that are prepared in advance by the user.

Furthermore, as described above, in the first process S1 of the drive waveform determination method of the present embodiment, exclusion conditions are acquired by receiving input via a network connection from the database server 600 that stores information related to patent documents. This makes it possible to easily obtain exclusion conditions related to latest patent documents.

Also, as described above, in the drive waveform determination method of the present embodiment, the exclusion conditions indicated by the exclusion condition information D5 include conditions related to parameters defining waveforms. This makes it possible to set parameters indicating, for example, potentials, applied voltages, and potential gradients defining waveforms as exclusion conditions.

Furthermore, as described above, in the drive waveform determination method of the present embodiment, the exclusion conditions indicated by the exclusion condition information D5 include conditions related to parameters indicating ejection characteristics. This makes it possible to set conditions related to parameters indicating ejection characteristics such as an ejection amount, an ejection speed, and a combined state as exclusion conditions.

As described above, the drive waveform determination method is implemented by causing a computer to execute the program PG1 that is an example of a "drive waveform determination program". That is, the program PG1 causes a computer to perform the first process S1 and the second process S2 described above.

Here, the drive waveform determination device 400 is an example of the computer. That is, as described above, the drive waveform determination device 400 includes the acquisition unit 451 that acquires the exclusion conditions indicated by the exclusion condition information D5 and the determination unit 452 that determines the waveform of the drive pulse PD based on multiple candidate waveforms and the exclusion conditions. This drive waveform determination device 400 implements the drive waveform determination method described above.

2. SECOND EMBODIMENT

A second embodiment of the present disclosure is described below. In the second embodiment described below, the same reference numbers as those used in the first embodiment are assigned to components that work or function similarly to the corresponding components in the first embodiment, and detailed descriptions of those components may be omitted as appropriate.

Figure 7:
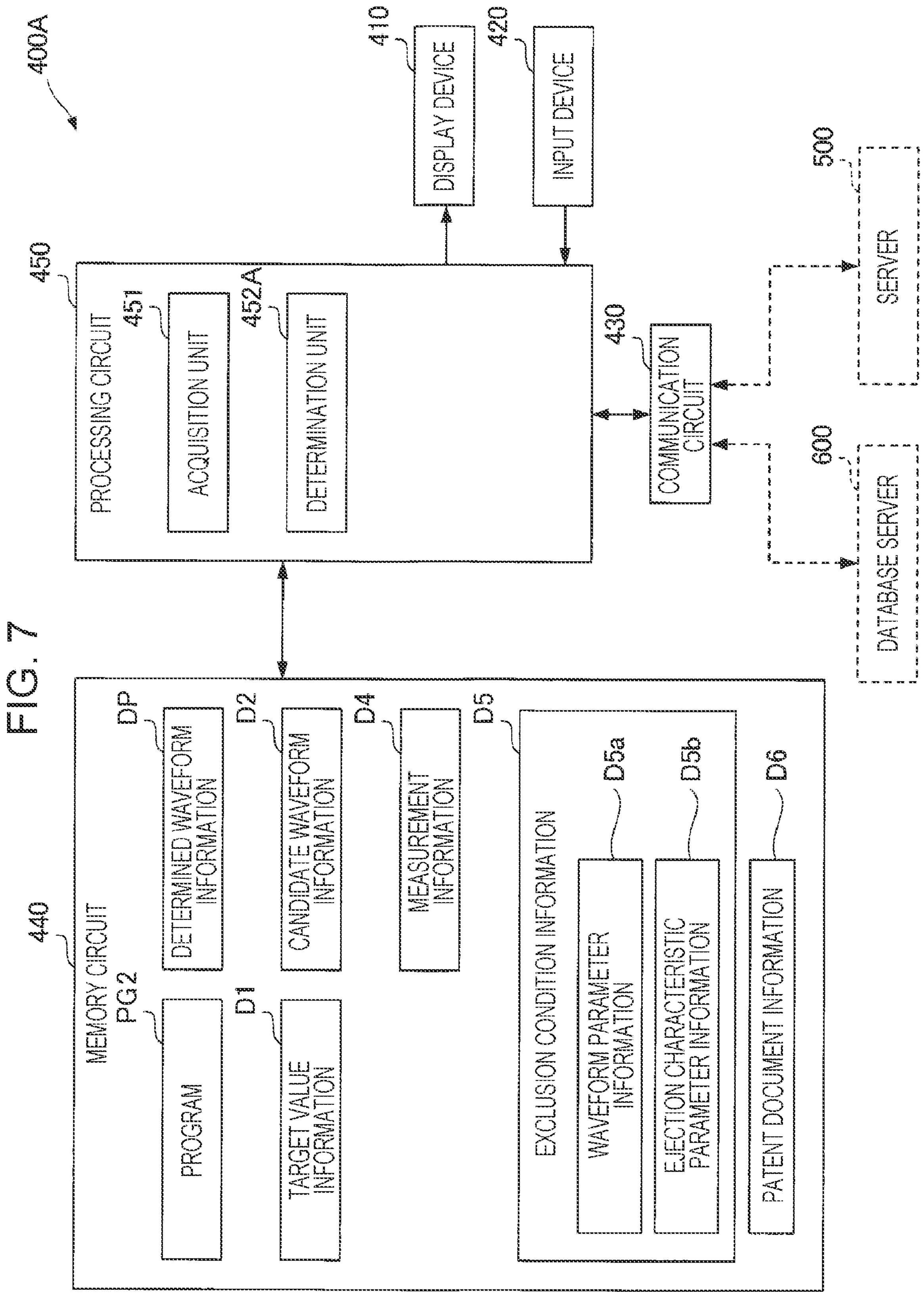
FIG. 7 is a drawing illustrating a drive waveform determination device according to a second embodiment.

FIG. 7 is a drawing illustrating a drive waveform determination device 400A according to the second embodiment. The drive waveform determination device 400A has a configuration similar to the configuration of the drive waveform determination device 400 of the first embodiment except that a program PG2 is used instead of the program PG1 as a "drive waveform determination program".

In the drive waveform determination device 400A, the processing circuit 450 executes the program PG2 and thereby functions as the acquisition unit 451 and a determination unit 452A. The determination unit 452A determines whether each of multiple candidate waveforms indicated by the candidate waveform information D2 satisfies any of exclusion conditions indicated by the exclusion condition information D5; acquires, based on the results of the determination, ejection characteristics of the liquid ejection head 210 that are observed when each of candidate waveforms, which are among the multiple candidate waveforms and do not satisfy the exclusion conditions, is used as the waveform of the drive pulse PD; and determines the waveform of the drive pulse PD based on the acquired ejection characteristics.

Figure 8:
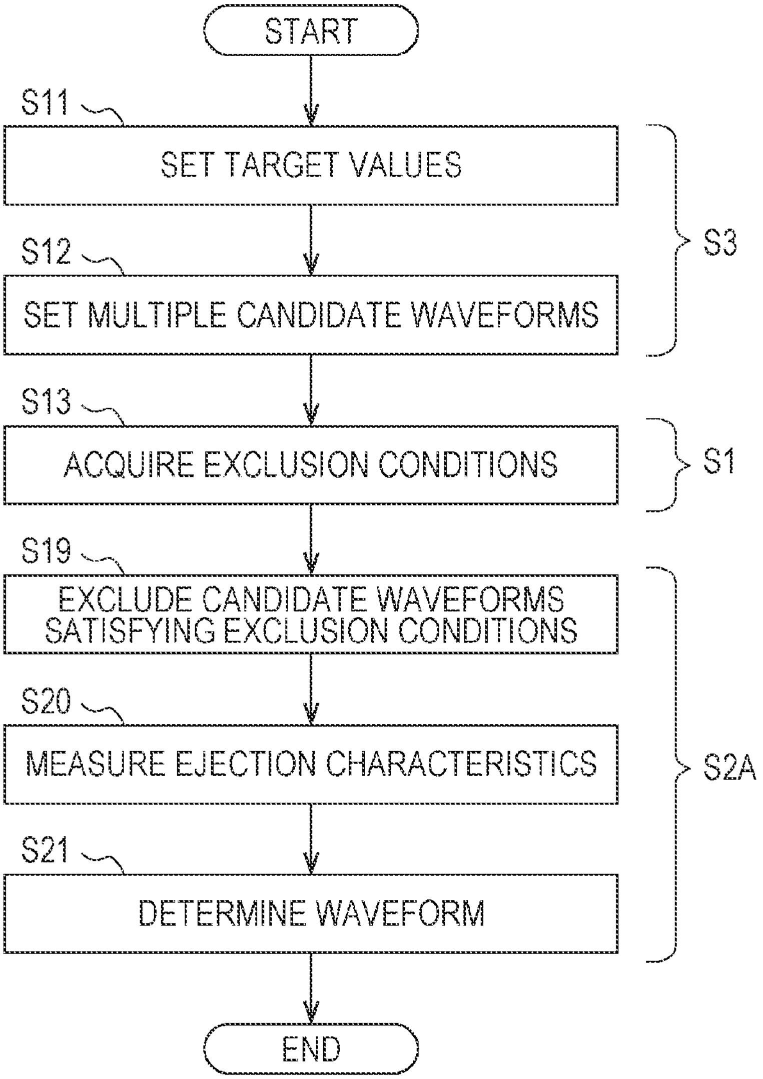
FIG. 8 is a flowchart illustrating a drive waveform determination method according to the second embodiment.

FIG. 8 is a flowchart illustrating a drive waveform determination method according to the second embodiment. The drive waveform determination method of the second embodiment is similar to the drive waveform determination method of the first embodiment described above except that the drive waveform determination method of the second embodiment includes a second process S2A instead of the second process S2.

In the second process S2A, the determination unit 452A determines the waveform of the drive pulse PD. Specifically, at step S19 in the second process S2A, the determination unit 452A first determines whether each of the multiple candidate waveforms indicated by the candidate waveform information D2 satisfies any of the exclusion conditions indicated by the exclusion condition information D5 and excludes candidate waveforms that satisfy the exclusion conditions.

Next, at step S20, the determination unit 452A acquires ejection characteristics of the liquid ejection head 210 by using each of remaining candidate waveforms, which are among the multiple candidate waveforms indicated by the candidate waveform information D2 and other than the candidate waveforms excluded at step S19, as the waveform of the drive pulse PD and thereby generates the measurement information D4. The ejection characteristics may be acquired based on the results of measurement performed by the measuring device 300 while driving the liquid ejecting apparatus 200 by using each of the remaining candidate waveforms as the waveform of the drive pulse PD or may be acquired based on the results of simulation of the ejection characteristics performed by using each of the remaining candidate waveforms as the waveform of the drive pulse PD.

Next, at step S21, the determination unit 452A determines the waveform of the drive pulse PD based on the ejection characteristics indicated by the measurement information D4 and thereby generates the determined waveform information DP. The determination of the waveform may be performed by automatically selecting, as the waveform of the drive pulse PD, a candidate waveform providing optimum ejection characteristics, such as the ejection amount, the ejection speed, and the stability, from the remaining candidate waveforms, or by notifying the user of two or more candidate waveforms in a Pareto relationship out of the remaining candidate waveforms and requesting the user to select a candidate waveform from the two or more candidate waveforms as the waveform of the drive pulse PD.

The second embodiment described above also makes it possible to improve usability for the determination of the waveform of a drive pulse. As described above, the second process S2A of the drive waveform determination method of the present embodiment determines whether each of the multiple candidate waveforms indicated by the candidate waveform information D2 satisfies any of the exclusion conditions indicated by the exclusion condition information D5; acquires, based on the results of the determination, ejection characteristics of the liquid ejection head 210 that are observed when each of candidate waveforms, which are among the multiple candidate waveforms and do not satisfy the exclusion conditions, is used as the waveform of the drive pulse PD; and determines the waveform of the drive pulse PD based on the acquired ejection characteristics. With this method, because ejection characteristics are acquired after candidate waveforms satisfying the exclusion conditions are excluded from the multiple candidate waveforms, it is possible to reduce the amount of time and the amount of ink necessary to acquire the ejection characteristics.

3. THIRD EMBODIMENT

A third embodiment of the present disclosure is described below. In the third embodiment described below, the same reference numbers as those used in the first embodiment are assigned to components that work or function similarly to the corresponding components in the first embodiment, and detailed descriptions of those components may be omitted as appropriate.

Figure 9:
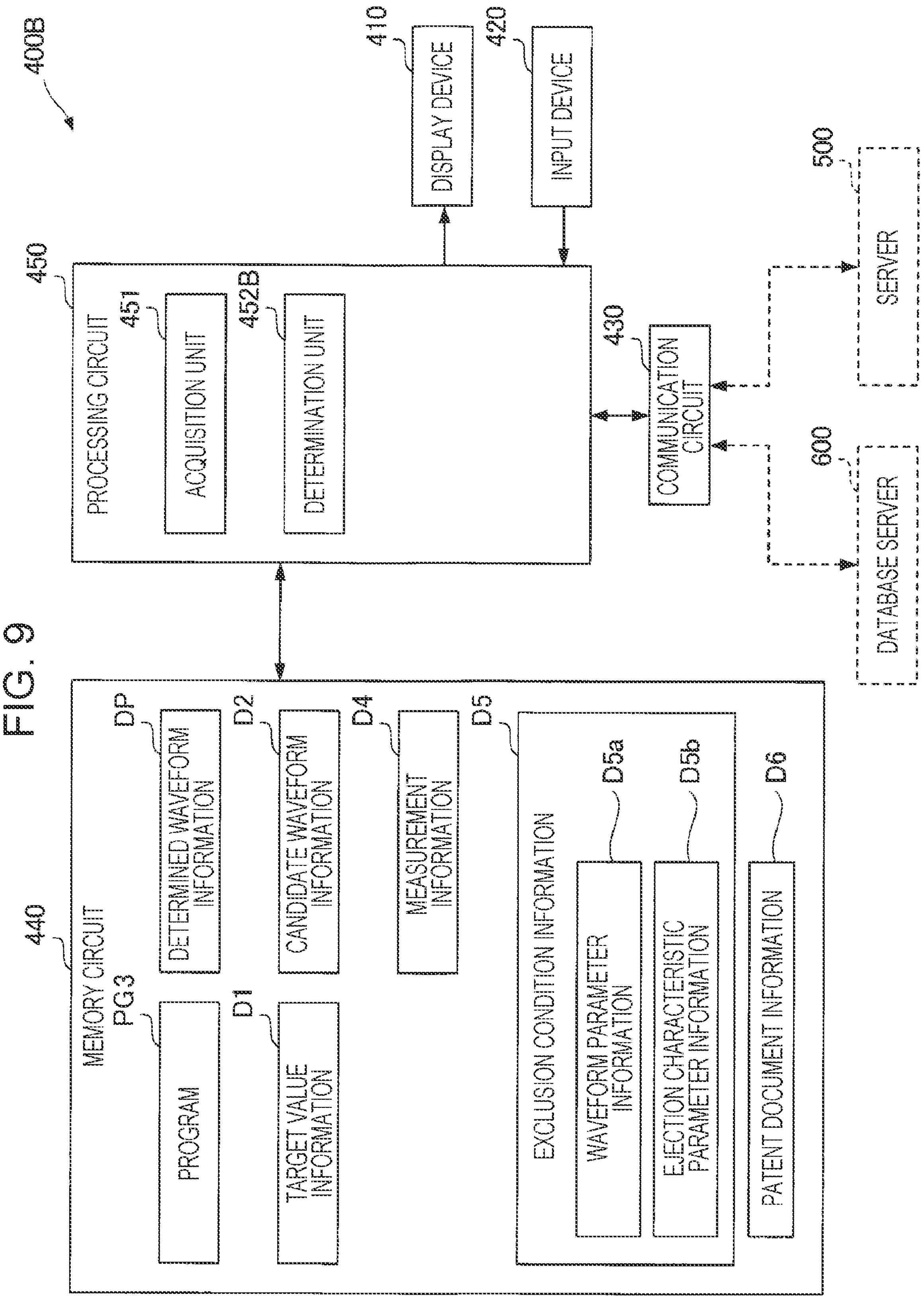
FIG. 9 is a drawing illustrating a drive waveform determination device according to a third embodiment.

FIG. 9 is a drawing illustrating a drive waveform determination device 400B according to the third embodiment. The drive waveform determination device 400B has a configuration similar to the configuration of the drive waveform determination device 400 of the first embodiment except that a program PG3 is used instead of the program PG1 as a “drive waveform determination program”.

In the drive waveform determination device 400B, the processing circuit 450 executes the program PG3 and thereby functions as the acquisition unit 451 and a determination unit 452B. The determination unit 452B acquires ejection characteristics of the liquid ejection head 210 by using each of the multiple candidate waveforms indicated by the candidate waveform information D2 as the waveform of the drive pulse PD, converts the ejection characteristics and the exclusion conditions indicated by the exclusion condition information D5 into functions, and determines the waveform of the drive pulse PD by using the functions.

Figure 10:
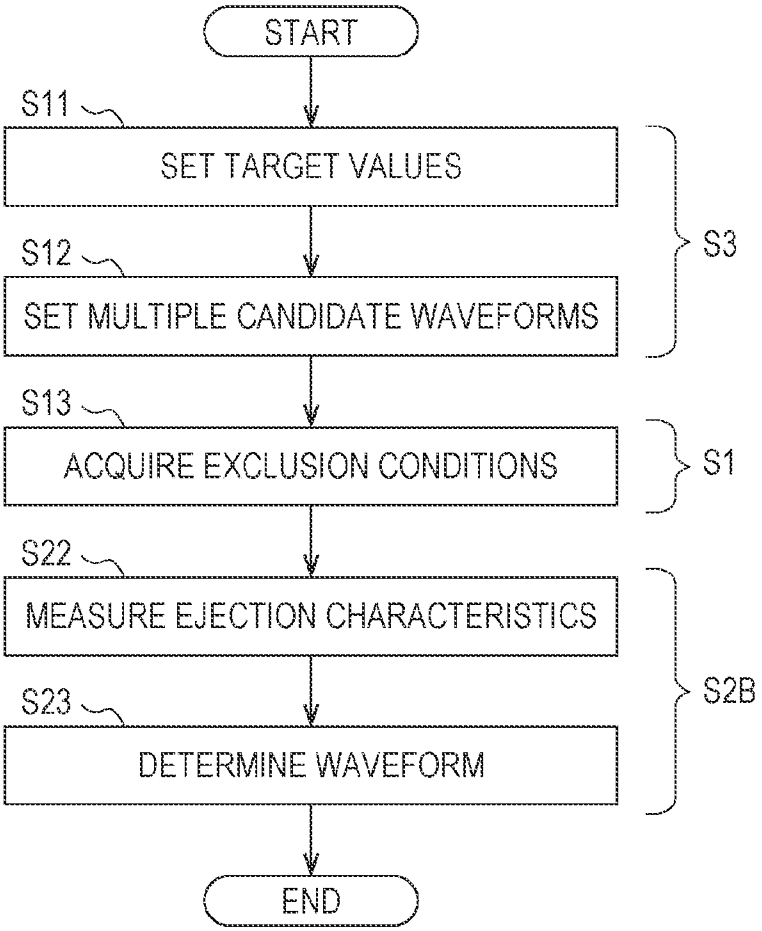
FIG. 10 is a flowchart illustrating a drive waveform determination method according to the third embodiment.

FIG. 10 is a flowchart illustrating a drive waveform determination method according to the third embodiment. The drive waveform determination method of the third embodiment is similar to the drive waveform determination method of the first embodiment except that the second process S2 is replaced by a second process S2B.

In the second process S2B, the determination unit 452B determines the waveform of the drive pulse PD. Specifically, at step S22 in the second process S2B, the determination unit 452B first acquires ejection characteristics of the liquid ejection head 210 by using each of the multiple candidate waveforms indicated by the candidate waveform information D2 as the waveform of the drive pulse PD and thereby generates the measurement information D4. The ejection characteristics may be acquired based on the results of measurement performed by the measuring device 300 while driving the liquid ejecting apparatus 200 by using each of the multiple candidate waveforms indicated by the candidate waveform information D2 as the waveform of the drive pulse PD or may be acquired based on the results of simulation of the ejection characteristics performed by using each of the multiple candidate waveforms indicated by the candidate waveform information D2 as the waveform of the drive pulse PD.

Next, at step S23, the determination unit 452B converts the ejection characteristics indicated by the measurement information D4 and the exclusion conditions indicated by the exclusion condition information D5 into functions and determines the waveform of the drive pulse PD by using the functions. The conversion into functions is described below.

When F(W) represents an ejection characteristic indicated by the measurement information D4, F' represents an ejection characteristic indicated by the target value information D1, and G represents an evaluation function for optimization in which the difference between F(W) and F' is minimized, the evaluation function G is expressed by $G=|F(W)-F'|$.

For example, when a waveform W is evaluated using the ejection amount, the ejection speed, and a distance LA illustrated in FIG. 3 as ejection characteristics, A(W) represents the ejection amount indicated by the measurement information D4, B(W) represents the ejection speed indicated by the measurement information D4, C(W) represents the distance LA indicated by the measurement information D4, A' represents the ejection amount indicated by the target value information D1, B' represents the ejection speed indicated by the target value information D1, C' represents the distance LA indicated by the target value information D1, and G(W) represents the evaluation function, the evaluation function G(W) is expressed by $G(W)=\alpha|A(W)-A'|+ VB(W)-B'|+\gamma|C(W)-C'|$.

Based on an algorithm for searching for a waveform W with which the evaluation function G(W) is minimized, a parameter Pn of the waveform W is evaluated while changing the parameter Pn as appropriate. Here, in the evaluation function G(W), each of $\alpha$, $\beta$, and $\gamma$ is a weight coefficient.

Also, when E(W) represents a penalty function and H represents a waveform selection function, the waveform selection function H is expressed by $H=G(W)+E(W)$. With the above formulas, a waveform W with which the waveform selection function H is minimized or becomes less than or equal to a threshold is selected.

Here, when the number of exclusion conditions is m, the penalty function E(W) is expressed by $E(W)=O(1)+O(2)+O(3)+\ldots+O(m)$. In this formula, each "O" represents either an exclusion condition related to a characteristic value of an ejection characteristic or an exclusion condition related to a parameter defining a waveform.

For example, when the condition represented by each "O" is a range of the parameter Pn of the waveform W and the parameter Pn of the waveform W is within the range represented by "O", "O" returns a value greater than or equal to 1 as a penalty. As another example, when the condition represented by "O" is a combination order in which multiple liquid droplets are combined by using a waveform for combining the liquid droplets and the combination order indicated by the measurement information D4 satisfies the condition of "O", "O" returns a value greater than or equal to 1 as a penalty.

For example, to avoid using a waveform that satisfies multiple exclusion conditions at the same time, the return value of each "O" may be set to 1 and the waveform may be rejected according to the waveform selection function H when E(W) is greater than or equal to 5; or "O" may represent multiple exclusion conditions and may return a value greater than or equal to 1 as a penalty when the multiple exclusion conditions are satisfied at the same time.

As described above, the waveform of the drive pulse PD is determined based on functions obtained by converting the ejection characteristics indicated by the measurement information D4 and the exclusion conditions indicated by the exclusion condition information D5.

The third embodiment described above also makes it possible to improve usability for the determination of the waveform of a drive pulse. As described above, in the second process S2B of the drive waveform determination method of the present embodiment, ejection characteristics of the liquid ejection head 210 are acquired by using each of the multiple candidate waveforms indicated by the candidate waveform information D2 as the waveform of the drive pulse PD, and the acquired ejection characteristics and the exclusion conditions indicated by the exclusion condition information D5 are converted into functions to determine the waveform of the drive pulse PD. Thus, even when various types of exclusion conditions are used, this method makes it possible to automatically determine a waveform of the drive pulse PD that does not satisfy the exclusion conditions.

4. VARIATION

Each of the embodiments described above may be modified in any appropriate manner. A specific example of a modification applicable to each of the above embodiments is described below. Two or more embodiments arbitrarily selected from the examples below may be combined as appropriate unless they do not conflict with each other.

4-1 First Variation

In the example described in the above embodiments, the program PG1 is executed by a processing circuit provided in the same device as that including a memory circuit in which the program PG1 is installed. However, the present disclosure is not limited to this configuration, and the program PG1 may be executed by a processing circuit provided in a device that is different from the device including the memory circuit in which the program PG1 is installed. For example, the program PG1 stored in the memory circuit 440 of the drive waveform determination device 400 may be executed by the processing circuit 280 of the liquid ejecting apparatus 200.

What is claimed is:

1. A drive waveform determination method of determining a waveform of a drive pulse to be applied to a driven element provided in a liquid ejection head that ejects a liquid, the method comprising:

a first process of acquiring an exclusion condition; and a second process of determining the waveform of the drive pulse based on multiple candidate waveforms and the exclusion condition, wherein in the first process, a condition related to a patent document is acquired as the exclusion condition.

2. The drive waveform determination method according to claim 1, wherein in the second process, when one or more candidate waveforms among the multiple candidate waveforms satisfy the exclusion condition, the one or more candidate waveforms are excluded from the multiple candidate waveforms in determining the waveform of the drive pulse.

3. The drive waveform determination method according to claim 1, wherein in the second process, when one or more candidate waveforms among the multiple candidate waveforms satisfy the exclusion condition, the user is notified that the one or more candidate waveforms satisfy the exclusion condition.

4. The drive waveform determination method according to claim 1, wherein the second process includes determining whether each of the multiple candidate waveforms satisfies the exclusion condition;

based on a result of the determining, acquiring ejection characteristics of the liquid ejection head by using each of one or more candidate waveforms, which are among the multiple candidate waveforms and do not satisfy the exclusion condition, as the waveform of the drive pulse; and determining the waveform of the drive pulse based on the ejection characteristics.

5. The drive waveform determination method according to claim 1, wherein the second process includes acquiring ejection characteristics of the liquid ejection head by using each of the multiple candidate waveforms as the waveform of the drive pulse;

determining at least one tentative waveform based on the ejection characteristics;

determining whether each of the at least one tentative waveform satisfies the exclusion condition; and based on a result of the determining, determining the waveform of the drive pulse by using a tentative waveform that is among the at least one tentative waveform and does not satisfy the exclusion condition.

6. The drive waveform determination method according to claim 1, wherein the second process includes acquiring ejection characteristics of the liquid ejection head by using each of the multiple candidate waveforms as the waveform of the drive pulse; and converting the ejection characteristics and the exclusion condition into functions to determine the waveform of the drive pulse.

7. The drive waveform determination method according to claim 1, wherein the second process includes selecting some candidate waveforms from the multiple candidate waveforms based on ejection characteristics of the liquid ejection head and the exclusion condition;

notifying a user of the some candidate waveforms; and determining the waveform of the drive pulse based on at least one candidate waveform selected by the user from the some candidate waveforms.

8. The drive waveform determination method according to claim 1, wherein in the first process, the exclusion condition is obtained by receiving input of the exclusion condition at a client used by a user.

9. The drive waveform determination method according to claim 8, further comprising:

a third process of causing a display unit to display an image used by the client to receive input of the exclusion condition.

10. The drive waveform determination method according to claim 1, wherein in the first process, the exclusion condition is acquired by receiving input of the exclusion condition at a server that is connected for communication to a client used by a user.

11. The drive waveform determination method according to claim 1, wherein in the first process, the exclusion condition is acquired by reading the exclusion condition stored in advance in a storage unit.

12. The drive waveform determination method according to claim 1, wherein in the first process, the exclusion condition is acquired by receiving input via a network connection from a database server storing information related to the patent document.

13. The drive waveform determination method according to claim 1, wherein the exclusion condition is related to a parameter defining a waveform.

14. The drive waveform determination method according to claim 1, wherein the exclusion condition is related to a parameter indicating an ejection characteristic.

15. A drive waveform determination device that determines a waveform of a drive pulse to be applied to a driven element provided in a liquid ejection head that ejects a liquid, the drive waveform determination device comprising:

an acquisition unit that acquires an exclusion condition; and a determination unit that determines the waveform of the drive pulse based on multiple candidate waveforms and the exclusion condition, wherein a condition related to a patent document is acquired as the exclusion condition.

16. A drive waveform determination method of determining a waveform of a drive pulse to be applied to a driven element provided in a liquid ejection head that ejects a liquid, the method comprising:

a first process of acquiring an exclusion condition; and a second process of determining the waveform of the drive pulse based on multiple candidate waveforms and the exclusion condition, wherein in the first process, the exclusion condition is acquired by receiving input via a network connection from a database server storing information related to a patent document.

* * * * *